United States Patent
Terada

(10) Patent No.: US 10,542,158 B1
(45) Date of Patent: Jan. 21, 2020

(54) IMAGE FORMING APPARATUS AND IMAGE FORMING METHOD WITH GAMMA CORRECTION

(71) Applicant: TOSHIBA TEC KABUSHIKI KAISHA, Shinagawa-ku, Tokyo (JP)

(72) Inventor: Takafumi Terada, Nagaizumi Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/164,240

(22) Filed: Oct. 18, 2018

(51) Int. Cl.
  G06K 15/02 (2006.01)
  H04N 1/00 (2006.01)
  H04N 1/23 (2006.01)

(52) U.S. Cl.
  CPC ....... H04N 1/00029 (2013.01); H04N 1/2307 (2013.01)

(58) Field of Classification Search
  None
  See application file for complete search history.

(56) References Cited

U.S. PATENT DOCUMENTS

| | | | | |
|---|---|---|---|---|
| 2004/0075708 | A1* | 4/2004 | Arakawa | B41J 29/393 347/19 |
| 2016/0031252 | A1* | 2/2016 | Kubozono | B41J 29/393 347/14 |
| 2016/0352963 | A1* | 12/2016 | Nagai | H04N 1/3871 |
| 2018/0103157 | A1* | 4/2018 | Mima | H04N 1/00092 |

* cited by examiner

Primary Examiner — Henok Shiferaw
(74) Attorney, Agent, or Firm — Foley & Lardner LLP

(57) ABSTRACT

An image forming apparatus includes a print unit, a print control unit, a reading unit, and a processing unit. The print unit forms an image on a medium at a resolution selected from several resolutions including a first resolution and a second, higher, resolution. The print control unit controls the print unit to print an image for correction including a first test pattern for printing a test pattern for gamma correction of the first resolution at a third resolution higher than the first resolution, and a second test pattern for the gamma correction of the second resolution, on the medium at the third resolution. The reading unit reads the image for correction printed on the medium. The processing unit obtains first correction information using the gamma correction for the first resolution and second correction information using the gamma correction for the second resolution, based on the image for correction.

12 Claims, 8 Drawing Sheets

IMAGE FORMING APPARATUS AND IMAGE FORMING METHOD WITH GAMMA CORRECTION

FIELD

Embodiments described herein relate generally to an image forming apparatus and an image forming method.

BACKGROUND

An image forming apparatus can be configured such that, first, it causes a test pattern for gamma adjustment to be printed on a sheet in order to perform the gamma adjustment. Next, the image forming apparatus reads an image from the sheet on which the test pattern is printed by using a scanner. Accordingly, the image forming apparatus calculates a correction amount for correcting target gradation characteristics based on read image data. Then, the image forming apparatus performs printing with correction based on the calculated correction amount when performing printing.

DETAILED DESCRIPTION

Figure 1:
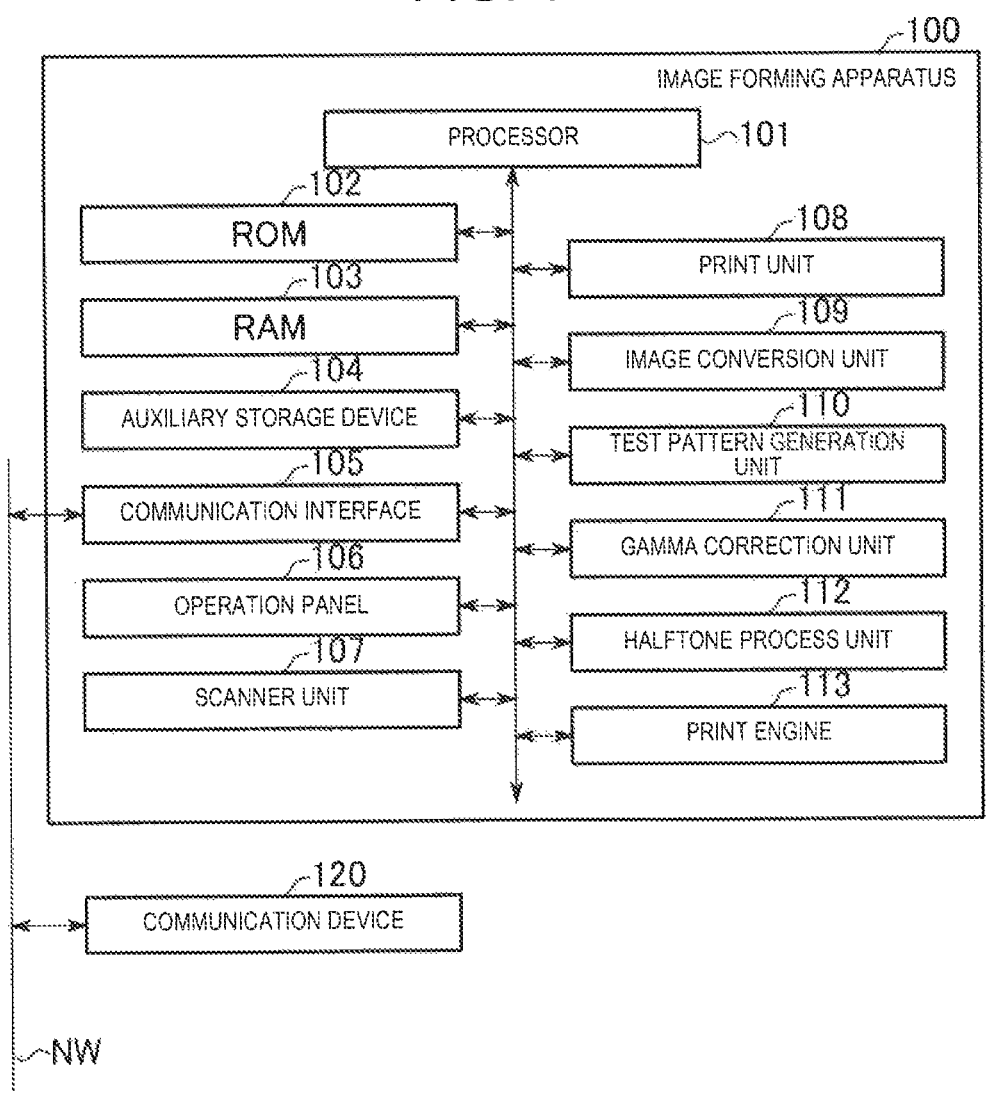
FIG. 1 is a block diagram illustrating an example of a main circuit configuration of an image forming apparatus according to the embodiment.

An image forming apparatus of an embodiment includes a print unit, a print control unit, a reading unit, and a processing unit. The print unit forms an image on a medium with a resolution selected from a plurality of resolutions including a first resolution and a second resolution with a higher resolution than the first resolution. The print control unit controls the print unit to print an image for correction including a first test pattern for performing printing a test pattern for gamma correction of a first resolution at a third resolution of a higher resolution than the first resolution and a second test pattern for the gamma correction of the second resolution on the medium at the third resolution. The reading unit reads the image printed on the medium. The processing unit acquires first correction information used in the gamma correction for the first resolution and second correction information used in the gamma correction for the second resolution based on the image for correction read from the medium by the reading unit.

Hereinafter, an image forming apparatus according to the embodiment will be described with reference to the drawings. In the drawings used for the description of the embodiments below, there are cases where a scale of each part is appropriately changed. In addition, for the sake of explanation, in the drawings used for the description of the embodiments below, a configuration may be omitted in some cases.

FIG. 1 is a block diagram illustrating an example of a main circuit configuration of an image forming apparatus 100 according to the embodiment.

For example, the image forming apparatus 100 is a multifunction peripheral (MFP), a copy machine, a printer, a facsimile, or the like. For example, the image forming apparatus 100 includes a print function, a scanner function, a copy function, a decoloring function, a facsimile function, or the like. The print function is a function for forming an image on an image forming medium P or the like by using a recording material such as toner. For example, the image forming medium P is a sheet or like a sheet shape. The scanner function is a function for reading an image from a document on which the image is formed. The copy function is a function for printing the image read from the document by using the scanner function on the image forming medium P by using the print function. The decoloring function is a function for decoloring an image formed by a color erasable recording material on the image forming medium P. As an example, the image forming apparatus 100 includes a processor 101, a read-only memory (ROM) 102, a random-access memory (RAM) 103, an auxiliary storage device 104, a communication interface 105, an operation panel 106, a scanner unit 107, a print unit 108, an image conversion unit 109, a test pattern generation unit 110, a gamma correction unit 111, and a halftone process unit 112.

The processor 101 corresponds to a central part of a computer which performs a process such as calculation and control necessary for an operation of the image forming apparatus 100. The processor 101 controls each unit to realize various functions of the image forming apparatus 100 based on a program such as system software, application software, and firmware stored in the ROM 102, the auxiliary storage device 104 or the like. A part or all of the program may be incorporated in a circuit of the processor 101. For example, the processor 101 is a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 101 is a combination of a plurality of these processors.

The processor 101 performs a raster image processor (RIP) process or the like in addition to a process (which will be described below), based on a program. The RIP process is a process of converting data described in a page description language such as postscript and portable document format (PDF) into raster data for printing.

The ROM 102 corresponds to a main storage device of a computer centered on the processor 101. The ROM 102 is a nonvolatile memory exclusively used for reading data. The ROM 102 stores the above-described program. In addition, the ROM 102 stores data used for the processor 101 to perform various processes or various setting values and the like.

The RAM 103 corresponds to the main storage device of the computer centered on the processor 101. The RAM 103 is a memory for reading and writing of data. The RAM 103 is used as a so-called work area or the like for storing data temporarily used by the processor 101 for performing various processes.

The auxiliary storage device 104 corresponds to an auxiliary storage device of the computer centered on the processor 101. For example, the auxiliary storage device 104 is an electric erasable programmable read-only memory (EEPROM), a hard disk drive (HDD), a solid-state drive (SSD), or the like. There is a case where the auxiliary storage device 104 stores the above-described program. In addition, the auxiliary storage device 104 stores data used for performing various processes by the processor 101, data generated by processing of the processor 101, various setting values, or the like. The image forming apparatus 100 may include an interface into which a storage medium such as a memory card and a universal serial bus (USB) memory can be inserted, instead of the auxiliary storage device 104 or in addition to the auxiliary storage device 104.

In addition, the auxiliary storage device 104 stores a test pattern image and a resolution information image. Furthermore, the auxiliary storage device 104 stores a correction table. The test pattern image, the resolution information image, and the correction table will be described. The test pattern image, the resolution information image, and the correction table may be stored in locations other than the ROM 102 or the like.

A program stored in the ROM 102 or the auxiliary storage device 104 includes a program for executing a process (which will be described below). As an example, the image forming apparatus 100 is transferred to a manager of the image forming apparatus 100 or the like in a state where a program is stored in the ROM 102 or the auxiliary storage device 104. However, the image forming apparatus 100 may be transferred to the manager of the image forming apparatus 100 or the like in the state where the program is not stored in the ROM 102 or the auxiliary storage device 104. In addition, the image forming apparatus 100 may be transferred to the manager or the like in a state where a program other than the program is stored in the ROM 102 or the auxiliary storage device 104. Accordingly, a program for executing a process (which will be described below) may be transferred to the manager or the like separately and written into the ROM 102 or the auxiliary storage device 104 under an operation by the manager or a serviceman. For example, the transfer of the program at this time can be realized by recording the program on a removable storage medium such as a magnetic disk, a magneto-optical disk, an optical disk, and a semiconductor memory, or by downloading the program via a network or the like.

The communication interface 105 is an interface for communicating the image forming apparatus 100 with a communication device 120 or the like via a network NW or the like. For example, the communication device 120 is a personal computer (PC), a server, a smartphone, or the like. The communication device 120 installs a printer driver therein. The network NW is typically a communication network including a private network such as an intranet. The network NW is typically a communication network including a local area network (LAN). The network NW may be a communication network including the Internet. The network NW may be a communication network including a wide area network (WAN).

The operation panel 106 includes a button, a touch panel, and the like to be operated by an operator of the image forming apparatus 100. For example, the touch panel is formed by laminating a display such as a liquid crystal display and an organic EL display and a pointing device such as a touchpad. Accordingly, the button and the touch panel functions as an input device for receiving an operation by an operator of the image forming apparatus 100. In addition, the display including the touch panel functions as a display device for informing the operator of the image forming apparatus 100 of various types of information.

The scanner unit 107 reads an image from a document placed on a scanner stand. The scanner unit 107 includes a scanner for reading an image from the document.

For example, the scanner adopts an optical reduction method including a capturing element such as a charge-coupled device (CCD) image sensor. Alternatively, the scanner adopts a contact sensor, a contact image sensor (CIS) method, including a capturing element such as a complementary metal-oxide-semiconductor (CMOS) image sensor. Alternatively, the scanner may adopt other well-known methods.

In addition, the scanner unit 107 includes a document feeder. For example, the document feeder is also referred to as an auto document feeder (ADF) or the like. The document feeder transports the document placed on a tray for the document. The image on the transported document is read by the scanner unit 107.

The print unit 108 prints an image on the image forming medium P by forming an image by using toner, ink, or the like. For example, the print unit 108 includes a laser printer, an ink jet printer, or another type of printer, and performs printing using the printer.

As an example, the print unit 108 can perform printing at the resolutions of two types of a low-resolution mode (600 dpi) and a high-resolution mode (1,200 dpi). The image forming apparatus 100 performs a halftone process according to the resolution on a print target image. That is, in a case where performing printing in the low-resolution mode, the image forming apparatus 100 performs the halftone process for the low-resolution mode on the print target image. Then, in a case where performing printing in the high-resolution mode, the image forming apparatus 100 performs the halftone process for the high-resolution mode on the print target image. The resolution (600 dpi) of the low-resolution mode is an example of the first resolution. The resolution (1,200 dpi) of the high-resolution mode is an example of the second resolution having higher resolution than the first resolution. In addition, the resolution (1,200 dpi) of the high-resolution mode is an example of the third resolution having higher resolution than the first resolution.

The halftone process for the low-resolution mode and the halftone process for the high-resolution mode will be described by using FIG. 2 and FIG. 3.

Figure 2:
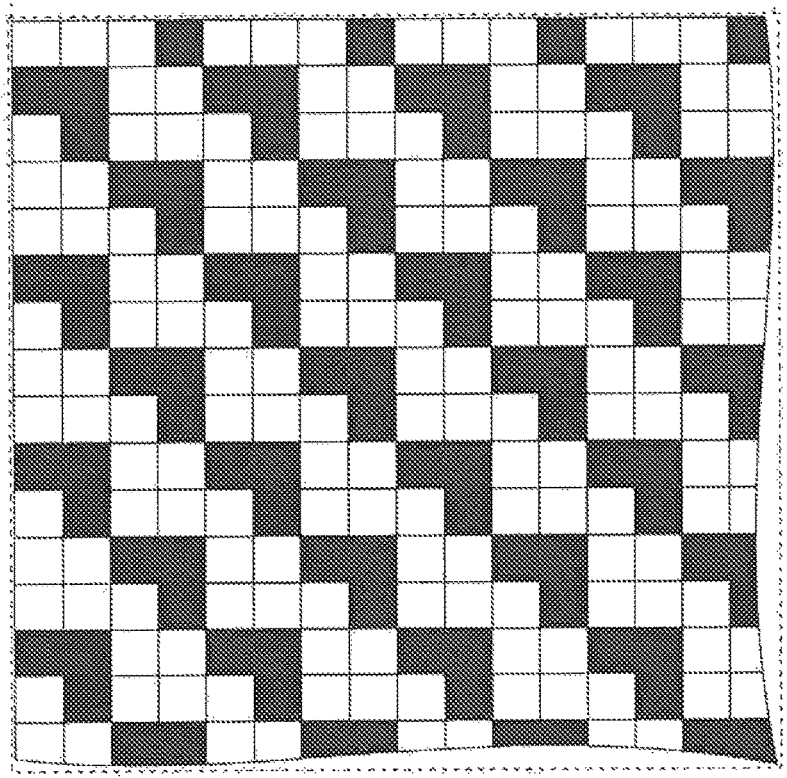
FIG. 2 is a diagram for explaining an example of a halftone process for a low-resolution mode.

FIG. 2 is a diagram for explaining an example of the halftone process for the low-resolution mode. FIG. 3 is a diagram for explaining an example of the halftone process for the high-resolution mode. Both halftone processes are binary output halftone processes. However, the halftone process may be a multilevel output rather than binary. In addition, although FIG. 2, and FIG. 3 illustrate only black components, each of the other colors is processed in the same manner.

A threshold matrix 401 illustrated in FIG. 2 indicates a threshold of the halftone process for the low-resolution mode. In a case where an image, in which the concentration of the black component is uniformly 96, is input to the halftone process for the low-resolution mode, an image of 600 dpi such as an image 402 is output. That is, a pixel of which the threshold is equal to or less than 96 is output as black. Then, a pixel of which the threshold exceeds 97 is output as white. It is assumed that the image input to the halftone process is an image of eight bits (eight bits/channels) as an example of the embodiment. Therefore, for example, each color component of the image is represented as an integer value of a range of 0 to 255. In FIG. 2, a part of the threshold matrix 401 and the image 402 is omitted. In addition, a shape of a halftone pattern for the high-resolution mode is not limited to one illustrated in FIG. 2. In addition, a shape of the halftone pattern for the low-resolution mode is not limited to one illustrated in FIG. 2.

Figure 3:
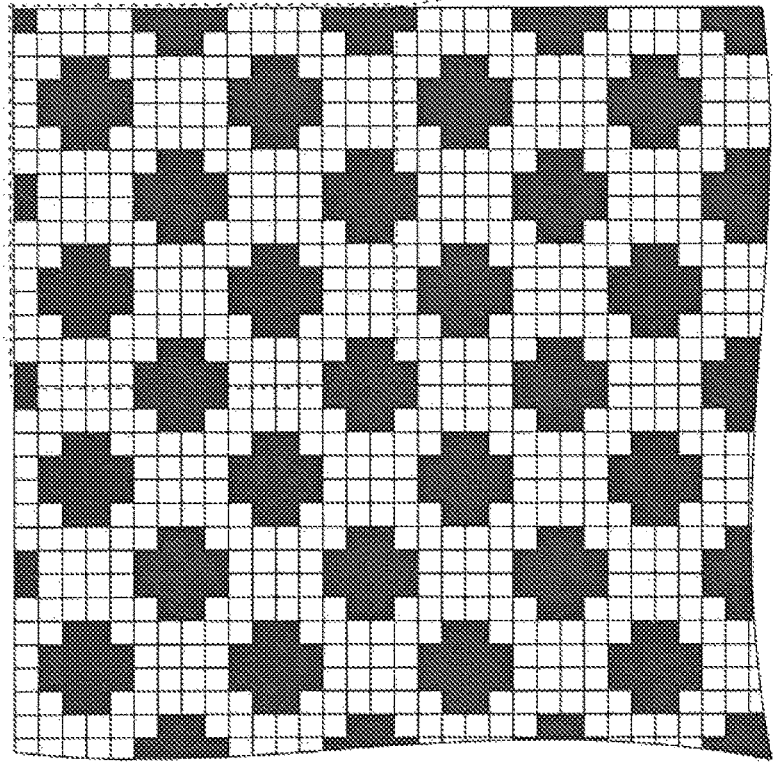
FIG. 3 is a diagram for explaining an example of the halftone process for a high-resolution mode.

A threshold matrix 411 illustrated in FIG. 3 indicates a threshold of the halftone process for the high-resolution mode. In a case where the image in which the concentration of the black component is uniformly 96, is input to the halftone process for the high-resolution mode, the image of 1,200 dpi such as the image 412 is output. In FIG. 3, a part of the threshold matrix 411 and the image 412 is omitted. In addition, the shape of the halftone pattern for the high-resolution mode is not limited to one illustrated in FIG. 3.

For example, the image conversion unit 109 performs color conversion or filtering on an image on which the RIP process is performed, and is a processor such as CPU, MPU, SoC, DSP, GPU, ASIC, PLD, and FPGA, and a circuit or the like.

For example, the test pattern generation unit 110 generates the test pattern for the gamma adjustment. For example, the test pattern generation unit 110 is the processor such as CPU, MPU, SoC, DSP, GPU, ASIC, PLD, and FPGA, and the circuit, or the like.

For example, the gamma correction unit 111 performs gamma correction on an image. The gamma correction unit 111 reads the correction table from the auxiliary storage device 104 or the like, and performs the gamma correction based on the correction table. For example, the gamma correction unit 111 is the processor such as CPU, MPU, SoC, DSP, GPU, ASIC, PLD, and FPGA, and the circuit, or the like.

For example, the halftone process unit 112 performs the halftone process on the image. The halftone process unit 112 performs the halftone process on the image printed in the low-resolution mode with the halftone pattern for the low-resolution mode. The halftone process unit 112 performs the halftone process on the image printed in the high-resolution mode with the halftone pattern for the high-resolution mode. However, in a case where the gamma correction is performed, the halftone process unit 112 performs a process which will be described below. For example, the halftone process unit 112 is the processor such as CPU, MPU, SoC, DSP, GPU, ASIC, PLD, and FPGA, and the circuit, or the like.

Figure 4:
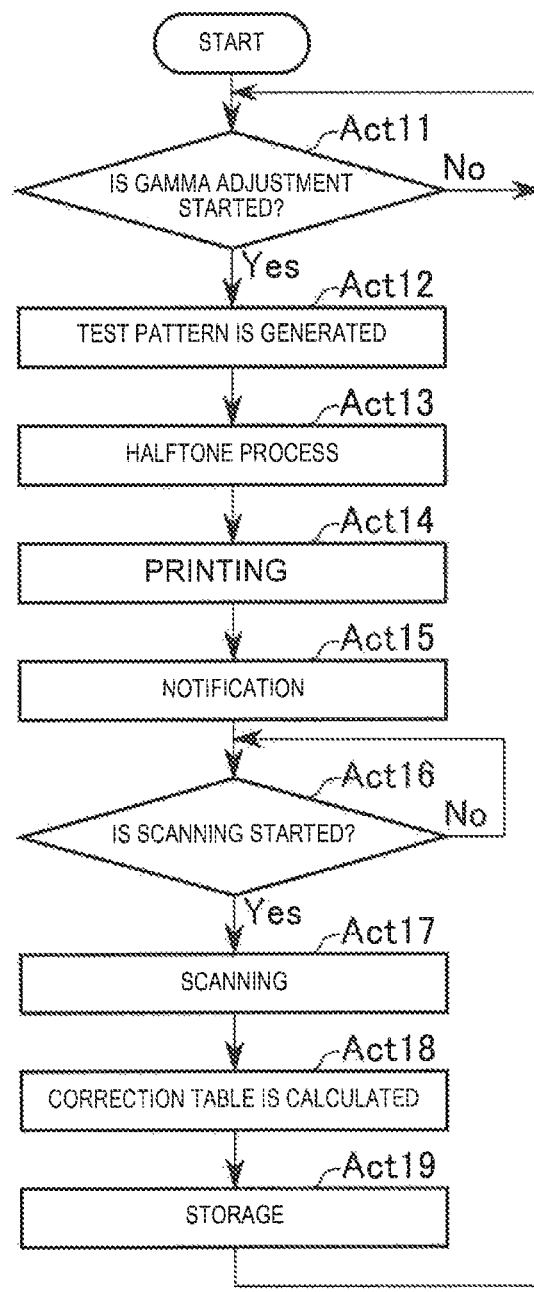
FIG. 4 is a flowchart illustrating an example of a process according to the embodiment by a processor in FIG. 1.
Figure 5:
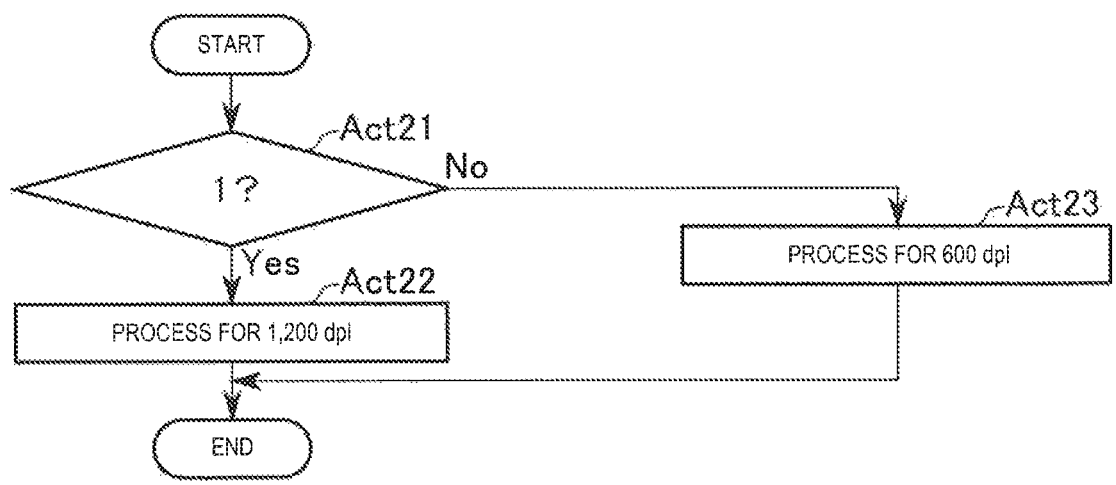
FIG. 5 is a flowchart illustrating an example of a process according to the embodiment by a halftone process unit in FIG. 1.

Hereinafter, an operation of the image forming apparatus 100 according to the embodiment will be described based on FIG. 4, FIG. 5, and the like. The contents of the processes in the following operation explanation are merely examples and various processes capable of obtaining the same result can be used appropriately. FIG. 4 is a flowchart of a process by the processor 101 of the image forming apparatus 100. For example, the processor 101 performs a process based on a program stored in the ROM 102, the auxiliary storage device 104, or the like. FIG. 5 is a flowchart of a process by the halftone process unit 112 of the image forming apparatus 100. For example, the halftone process unit 112 performs a process based on a program or the like stored in the ROM 102, the auxiliary storage device 104, the halftone process unit 112, or the like. In a case where the processor 101 or the halftone process unit 112 proceeds to Act (N+1) after a process of Act N (N is natural number), a description that explains this fact may be omitted.

The processor 101 of the image forming apparatus 100 in Act 11 of FIG. 4 determines whether or not the gamma adjustment is started. If it is determined that the gamma adjustment is not started, the processor 101 returns to Act 11 by determining as No in Act 11. Then, the processor 101 repeats Act 11 until it is determined that the gamma adjustment is started. For example, the operator of the image forming apparatus 100 instructs the image forming apparatus 100 to start the gamma adjustment by operating the operation panel 106. If there is an instruction operation, the processor 101 determines that the gamma adjustment is started. If it is determined that the gamma adjustment is started, the processor 101 proceeds to Act 12 by determining as Yes in Act 11.

Figure 6:
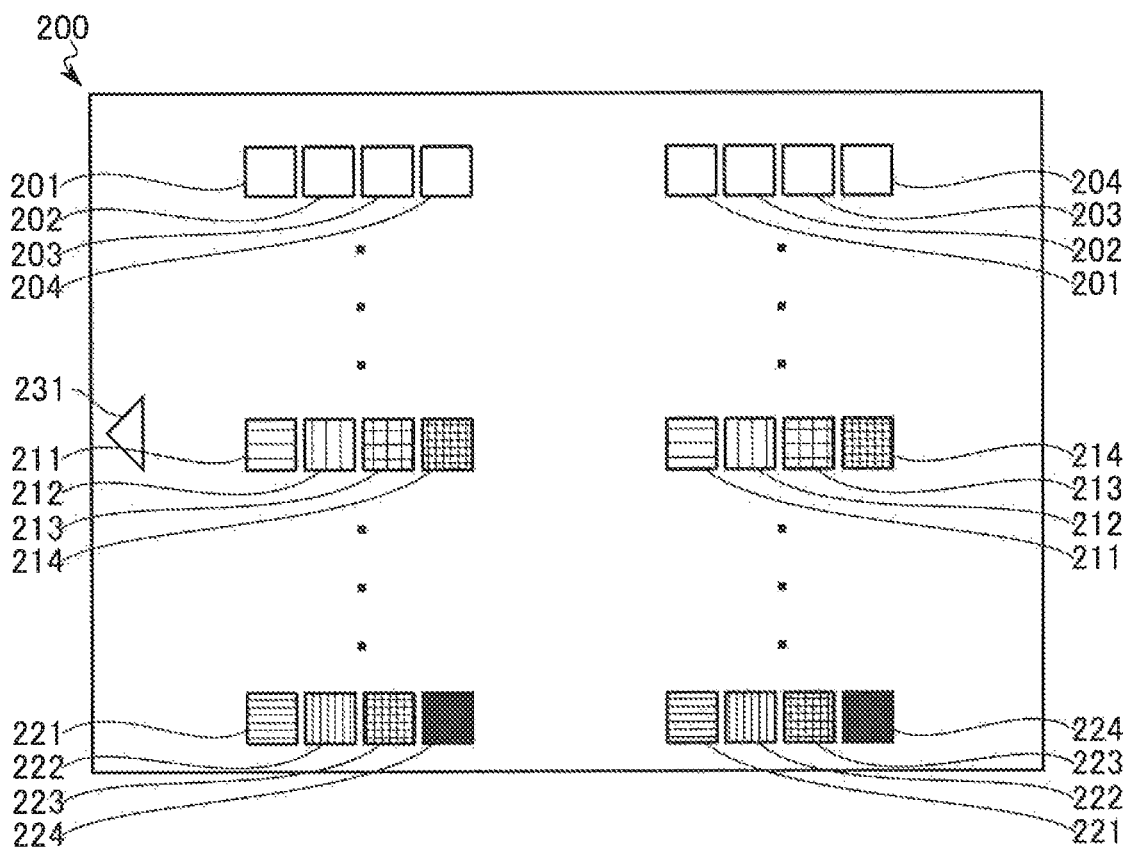
FIG. 6 is a diagram illustrating an example of a test pattern image according to the embodiment.
Figure 7:
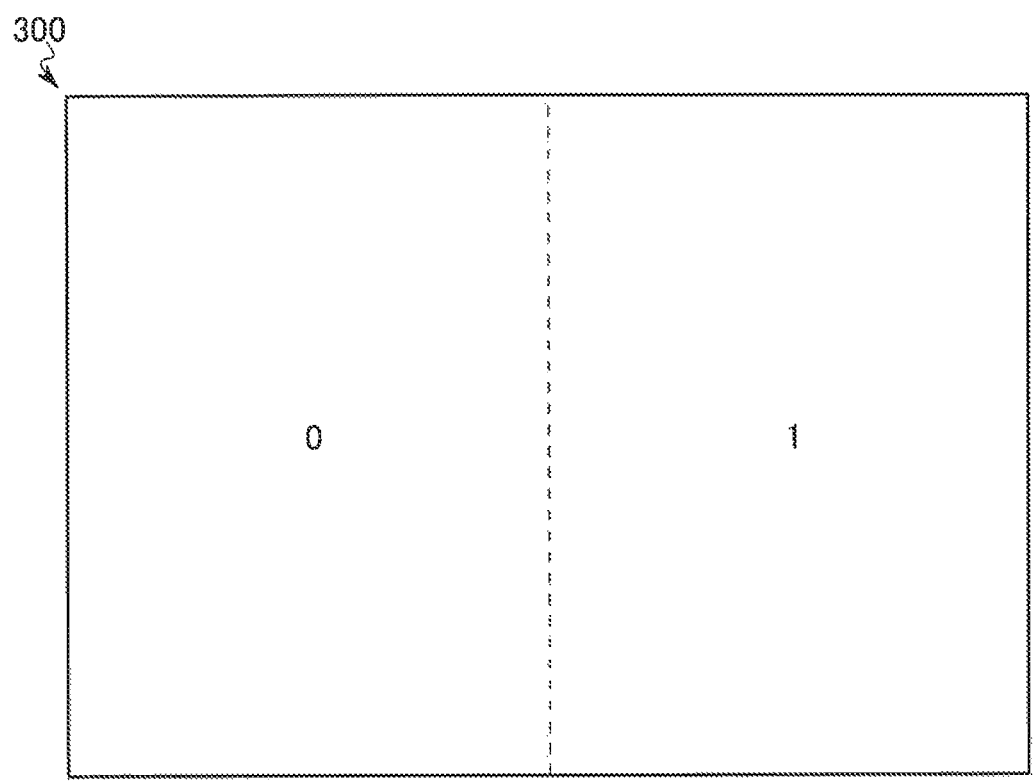
FIG. 7 is a diagram illustrating an example of a resolution information image according to the embodiment.

In Act 12, the processor 101 instructs the test pattern generation unit 110 to generate the test pattern image as illustrated in FIG. 6 and the resolution information image as illustrated in FIG. 7. Based on this instruction, the test pattern generation unit 110 generates the test pattern image and the resolution information image. For example, the test pattern generation unit 110 generates the test pattern image and the resolution information image by reading the test pattern image and the resolution information image from the auxiliary storage device 104.

FIG. 6 is a diagram illustrating an example of the test pattern image 200. The test pattern image 200 is image data to be printed in the print unit 108 in order to perform the gamma adjustment on each color of cyan, magenta, yellow, and key (black) (CMYK). As an example, the test pattern image 200 includes a cyan area 201, a magenta area 202, a yellow area 203, a black area 204, a cyan area 211, a magenta area 212, a yellow area 213, a black area 214, a cyan area 221, a magenta area 222, a yellow area 223, and a black area 224. Furthermore, the test pattern image 200 includes a mark 231.

As an example, the cyan area 201 is an area coated with the concentration of C10 M0 Y0 K0 (cyan (C): 10%, magenta (M): 0%, yellow (Y): 0%, key (black) (K): 0%. The same is applied to following description). As an example, the magenta area 202 is an area coated with C0 M10 Y0 K0. As an example, the yellow area 203 is an area coated with C0 M0 Y10 K0. As an example, the black area 204 is an area coated with C0 M0 Y0 K10.

In addition, as an example, the cyan area 211 is an area coated with C50 M0 Y0 K0. As an example, the magenta area 212 is an area coated with C0 M50 Y0 K0. As an example, the yellow area 213 is an area coated with C0 M0 Y50 K0. As an example, the black area 214 is an area coated with C0 M0 Y0 K50.

Then, as an example, the cyan area 221 is an area coated with C100 M0 Y0 K0. As an example, the magenta area 222 is an area coated with C0 M100 Y0 K0. As an example, the yellow area 223 is an area coated with C0 M0 Y100 K0. As an example, the black area 224 is an area coated with C0 M0 Y0 K100.

Furthermore, the test pattern image 200 includes a plurality of areas filled with a concentration therebetween between an area filled with 10% concentration and an area filled with 50% concentration. In addition, the test pattern image 200 includes a plurality of areas filled with a concentration therebetween between an area filled with 50% concentration and an area filled with 100% concentration. For example, in the test pattern image 200, between the cyan area 201 and the cyan area 211, areas having the cyan concentration higher than that of the cyan area 201 and lower than that of the cyan area 211 are arranged in a concentration order. Accordingly, in the test pattern image 200, between the cyan area 211 and the cyan area 221, areas having the cyan concentration higher than that of the cyan area 211 and lower than that of the cyan area 221 are arranged in a concentration order. In addition, the same is also applied to the magenta, the yellow, and the black.

As described above, the test pattern image 200 includes a plurality of areas in which the concentration of only one color among CMYK is not 0%, and the concentrations of the other three colors are 0%. Accordingly, in the test pattern image 200, areas having the same color and different concentrations are arranged in a line in the concentration order. As an example, the test pattern image 200 includes columns corresponding to each of the CMYK colors arranged in such a concentration order, that is, four columns. Furthermore, as an example, the test pattern image 200 includes two sets of the four columns of one set in the left half of the test pattern image 200 and one set in the right half of the test pattern image 200.

The mark 231 is a mark for easily understanding a direction in which the image forming medium P on which the test pattern image 200 is printed is read by the scanner unit 107. Here, the "direction" indicates upward, downward, leftward, and rightward directions and does not indicate the front and back directions. Hereinafter, the "direction" indicates the same direction. A shape and a position of the mark 231 are not limited to those illustrated in FIG. 6.

FIG. 7 is a diagram illustrating an example of the resolution information image 300. As an example, the resolution information image 300 is the image data of one bit indicating the left half portion as zero and the right half portion as one. It is assumed that zero included in the resolution information image indicates 600 dpi. Accordingly, it is assumed that one included in the resolution indicates 1,200 dpi. In addition, the resolution information image 300 has the same number of pixels as the test pattern image 200 in the main scanning direction and the sub-scanning direction. For example, if the number of pixels of the resolution information image 300 is x pixel×y pixel, the number of pixels of the test pattern image 200 is also x pixel×y pixel. However, x and y are natural numbers.

In Act 13, the processor 101 instructs the halftone process unit 112 to perform the halftone process on the test pattern image 200. Based on this instruction, the halftone process unit 112 performs the process illustrated in FIG. 5 on each pixel of the test pattern image 200 as a target.

In Act 21, the halftone process unit 112 determines whether or not the pixel of the resolution information image corresponding to a target pixel indicates one. If the position of the target pixel is (x1 pixel, y1 pixel), the position of the pixel of a corresponding resolution information image is, for example, (x1 pixel, y1 pixel). The x1 is an integer of a range of 1≤x1≤x. In addition, the y1 is an integer of a range of 1≤y1≤y. If the pixel of the resolution information image corresponding to the target pixel indicates one, the halftone process unit 112 proceeds the process to Act 22 by determining as Yes in Act 21. In the following description, it is assumed that the position of the target pixel is also (x1 pixel, y1 pixel).

In Act 22, the halftone process unit 112 performs the halftone process on the target pixel by using the threshold matrix 411 for 1,200 dpi as illustrated in FIG. 3. As an example, the halftone process of black will be described as an example. If the black concentration of the target pixel is equal to or greater than the threshold of the threshold matrix 411 (x1 row, y1 column), the halftone process unit 112 determines that the black of the position of an output image (x1 pixel, y1 pixel) is turned on. If the black concentration of the target pixel is less than the threshold, the halftone process unit 112 determines that the black of the position of the target pixel is turned off. The halftone process unit 112 also performs the same process on the cyan, the magenta, and the yellow. The halftone process unit 112 completes a process illustrated in FIG. 5 with respect to the target pixel after a process of Act 22.

If the pixel of the resolution information image corresponding to the target pixel indicates zero, the halftone process unit 112 proceeds the process to Act 23 by determining as No in Act 21.

Figure 8:
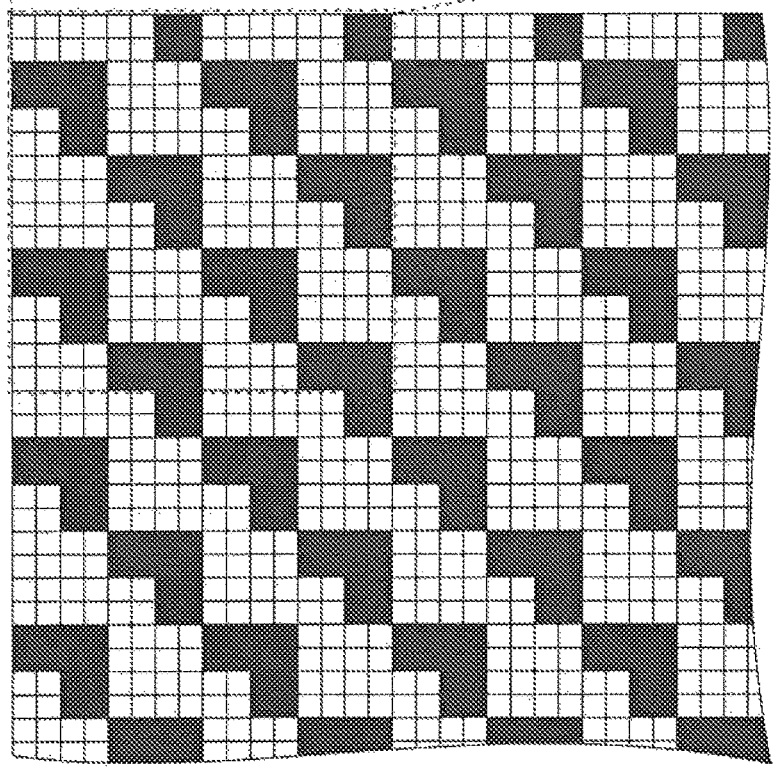
FIG. 8 is a diagram for explaining an example of a halftone process for gamma adjustment.

In Act 23, the halftone process unit 112 performs the halftone process by using a threshold matrix 421 as illustrated in FIG. 8. FIG. 8 is a diagram for explaining an example of the halftone process for the gamma adjustment.

The threshold matrix 421 is obtained by vertically doubling and horizontally doubling the number of pixels of the threshold matrix 401 for 600 dpi illustrated in FIG. 2. For example, the threshold of the threshold matrix 421 (x2 row, y2 column) is the same as a threshold ((ceil (0.5×x2)) row, (ceil (0.5×y2)) column) of the threshold matrix 401. The x2 and the y2 are natural numbers. In addition, the ceil (X) indicates the ceiling function of x. In a case where the halftone process is performed by using the threshold matrix 421 on an image in which the black component is uniformly 96, the image such as the image 422 is output. Since the image 422 is the image of 1,200 dpi, it is possible to perform printing in the high-resolution mode. The threshold matrix 421 may be stored in the auxiliary storage device 104 or the like in advance, and may be generated by the processor 101, the test pattern generation unit 110, or the like.

The halftone process unit 112 performs the halftone process by using the threshold matrix 421 on the target pixel. As an example, the halftone process of black will be described as an example. If the black concentration of the target pixel is equal to or greater than the threshold of the threshold matrix 421 (x1 row, y1 column), the halftone process unit 112 determines that the black in a position (x1 pixel, y1 pixel) of the output image is turned on. If the black concentration of the target pixel is less than the threshold, the halftone process unit 112 determines that the black in the position is turned off. The halftone process unit 112 also performs the same process on the cyan, the magenta, and the yellow.

The halftone process unit 112 completes the process illustrated in FIG. 5 on the target pixel, after a process of Act 23. In FIG. 8, a part of the threshold matrix 421 and the image 422 is omitted.

Furthermore, the halftone process unit 112 outputs an image of one bit (one bit/channel) of 1,200 dpi, based on a result of the process illustrated in FIG. 5 on each pixel. The image is referred to as an "image for printing" below. The image for printing indicates two values of turn on and turn off in each color of CMYK with respect to each pixel. The image for printing is an image with a resolution of 1,200 dpi, but the image includes a test pattern portion for 600 dpi and a test pattern portion for 1,200 dpi. Accordingly, the image for printing can be printed at 1,200 dpi even though the image includes the test pattern portion for 600 dpi. In the embodiment, as an example, the image for printing includes the test pattern for 600 dpi in a left half portion and the test pattern for 1,200 dpi in a right half portion. The test pattern for 600 dpi included in the image for printing is an example of the first test pattern. In addition, the test pattern for 1,200 dpi included in the image for printing is an example of the second test pattern. The image for printing is an example of the image for correction including the first test pattern and the second test pattern. Accordingly, the halftone process unit 112 is an example of a generation unit of generating the image for correction.

In Act 14 of FIG. 4, the processor 101 controls the print unit 108 so as to print the image for printing in the high-resolution mode (1,200 dpi). The image forming apparatus 100 discharges the image forming medium P on which the image is printed to a discharge tray.

The processor 101 is an example of the print control unit of controlling the print unit 108 to print the image for printing.

In Act 15, the processor 101 notifies various types of information. For example, the processor 101 causes an image including the various types of information to be displayed on the touch panel of the operation panel 106. For example, the various types of information include contents for instructing an operator to read the image forming medium P to be discharged to the discharge tray by the scanner unit 107. In addition, for example, the various types of information include contents for instructing the operator in which direction the image forming medium P is read by the scanner unit 107. For example, the processor 101 instructs the direction based on the position of the mark 231 to be printed on the image forming medium P.

In Act 16, the processor 101 waits for an operation instructing the start of scanning to be performed.

The operator of the image forming apparatus 100 reads the image from the image forming medium P on which the image for printing is printed by the scanner unit 107. For this, the operator places the image forming medium P on a scanner table or a tray for the document. Then, the operator instructs the image forming apparatus 100 to start scanning by operating the operation panel 106.

If an operation instructing the start of the scanning is performed, the processor 101 proceeds the process to Act 17 by determining as Yes in Act 16.

In Act 17, the processor 101 controls the scanner unit 107 so as to read the image from the image forming medium P placed on the scanner table or the tray for the document. The scanner unit 107 reads the image for printing printed on the image forming medium P under the control.

Therefore, the scanner unit 107 is an example of the reading unit of reading the image for printing printed on the image forming medium P.

In Act 18, the processor 101 calculates a correction table for 600 dpi and a correction table for 1,200 dpi based on the image read in Act 17. That is, the processor 101 calculates the correction table for 600 dpi by using the test pattern for 600 dpi included in the left half portion of the image read in Act 17. The processor 101 calculates the correction table for 1,200 dpi by using the test pattern for 1,200 dpi included in the right half portion of the image read in Act 17. The processor 101 calculates the correction table with respect to each color of CMYK. Therefore, here, it is assumed that the processor 101 calculates the total eight correction tables. A known method is used for the calculation of each correction table.

Figure 9:
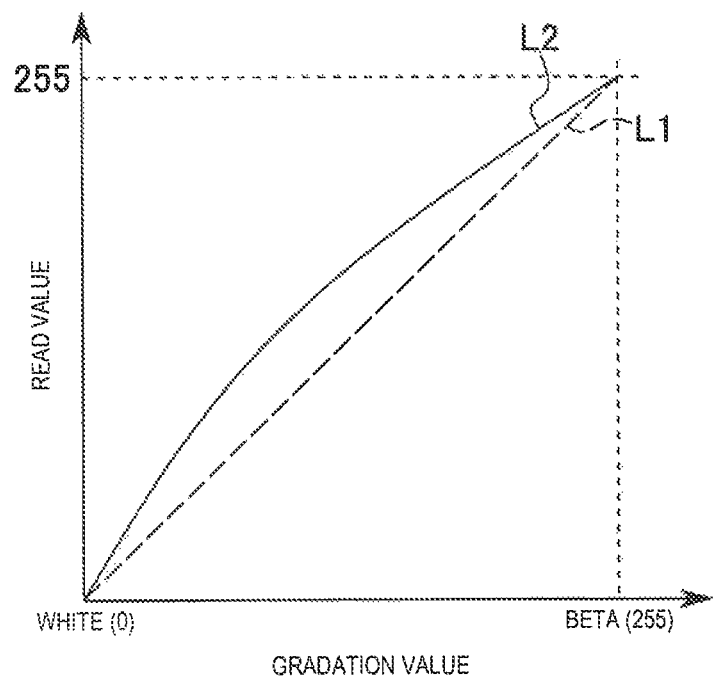
FIG. 9 is a diagram illustrating an example of gradation characteristics.
Figure 10:
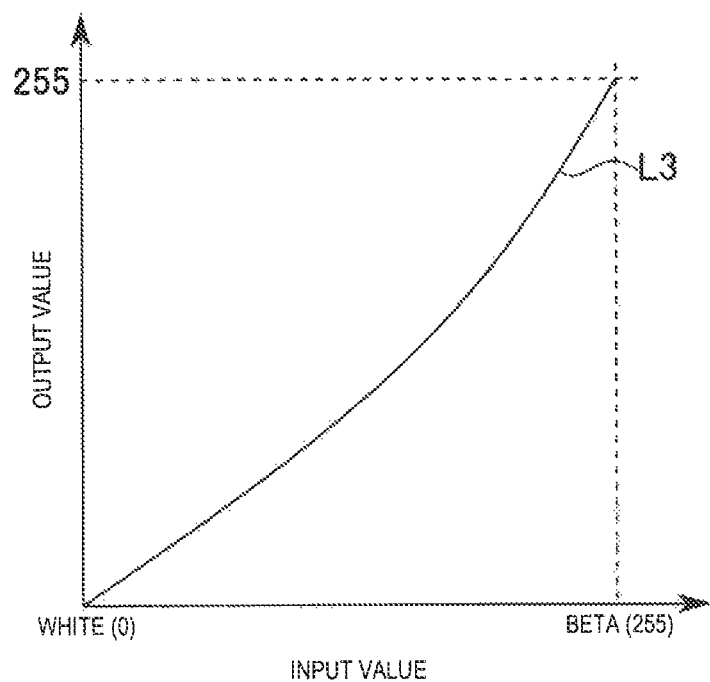
FIG. 10 is a diagram illustrating an example of a correction table.

For example, calculation examples of the correction table are illustrated in FIG. 9 and FIG. 10. FIG. 9 is a diagram illustrating an example of gradation characteristics. FIG. 10 is a diagram illustrating an example of the correction table.

A line L1 illustrated in FIG. 9 indicates target gradation characteristics. A curve L2 indicates the gradation characteristics based on the image read by the scanner unit 107.

Based on this, the processor 101 calculates a curve L3 illustrating the correction table. For example, if the line L1 is a straight line with a slope of 1, the processor 101 calculates the curve L3 by inversely transforming the curve L2. That is, the curve L3 is an inverse function of the curve L2.

The correction table for 600 dpi calculated as described above is used for the gamma correction by the gamma correction unit 111 when printing is performed in a low-resolution print mode. The correction table for 1,200 dpi calculated as described above is used for the gamma correction by the gamma correction unit 111 when printing is performed in a high-resolution print mode. Therefore, the gamma correction unit 111 is an example of a correction unit of correcting gradation in printing at 600 dpi based on the correction table for 600 dpi and correcting gradation in printing at 1,200 dpi based on the correction table for 1,200 dpi.

From the above, the correction table for 600 dpi is the first correction information used for the gamma correction for the first resolution. In addition, the correction table for 1,200 dpi is the second correction information used for the gamma correction for the second resolution. In addition, from the above, the processor 101 is an example of the processing unit of obtaining the first correction information and the second correction information.

In Act 19, the processor 101 stores each correction table calculated in Act 18 in the auxiliary storage device 104 or the like. For example, in a case where an old correction table is stored in the auxiliary storage device 104 or the like, the old correction table is overwritten with the new correction table calculated in Act 18. The processor 101 returns the process to Act 11 after a process in Act 19.

In the image forming apparatus 100 of the embodiment, the test pattern for the low-resolution mode (600 dpi) and the test pattern for the high-resolution mode (1,200 dpi) are printed on one sheet of the image forming medium P. In addition, the image forming apparatus 100 of the embodiment prints the test pattern for the low-resolution and the test pattern for the high-resolution with the same resolution. With this, the image forming apparatus 100 of the embodiment can perform the gamma correction of the plurality of resolutions at a time.

According to the image forming apparatus 100 of the embodiment, the halftone process unit 112 processes the test pattern for the low-resolution to be printed with the high-resolution so as to print the test pattern for the low-resolution with the high-resolution. With this, the image forming apparatus 100 of the embodiment can cause the test pattern for the low-resolution and the test pattern for the high-resolution to be printed with the same resolution.

According to the image forming apparatus 100 of the embodiment, the halftone process unit 112 doubles the number of pixels in the vertical and horizontal directions of the test pattern for the low-resolution. With this, the image forming apparatus 100 of the embodiment can print the test pattern for the low-resolution and the test pattern for the high-resolution with the same resolution.

The image forming apparatus 100 of the embodiment prints the test pattern for the low-resolution mode (600 dpi) and the test pattern of the high-resolution mode (1,200 dpi) in the high-resolution mode (1,200 dpi). With this, the image forming apparatus 100 of the embodiment can perform the gamma correction in the low-resolution mode and the high-resolution mode at a time by the printing in the high-resolution mode.

According to the image forming apparatus 100 of the embodiment, the resolution of the high-resolution mode is an integer multiple of the resolution of the low-resolution mode. With this, by integer multiplication of the number of pixels in the vertical and horizontal directions of the test pattern for the low-resolution, the test pattern for the low-resolution can be printed in the high-resolution mode.

According to the image forming apparatus 100 of the embodiment, the gamma correction unit 111 performs the gamma correction by using the correction table for the low-resolution mode when performing printing in the low-resolution mode. When performing the printing in the high-resolution mode, the gamma correction unit 111 performs the gamma correction by using the correction table for the high-resolution mode. With this, in the image forming apparatus 100 of the embodiment, printing can be performed with proper gradation for each resolution.

The above-described embodiment can also be modified as follows.

In the above-described embodiment, the halftone process unit 112 determines whether or not the target pixel belongs to an area including the test pattern for 600 dpi by using the resolution information image. That is, in a case where the pixel of the resolution information image corresponding to the target pixel indicates one, the halftone process unit 112 determines that the target pixel belongs to an area (right half portion of test pattern image) including the test pattern for 1,200 dpi. In a case where the pixel of the resolution information image corresponding to the target pixel is zero, the halftone process unit 112 determines that the target pixel belongs to an area (left half portion of test pattern image) including the test pattern for 600 dpi. However, the halftone process unit 112 may perform the determination by a method other than the method using the resolution information image. For example, the halftone process unit 112 performs the determination based on the coordinates of the target pixel.

In the above-described embodiment, the image forming apparatus 100 prints the image for printing output by the halftone process unit 112. However, the image forming apparatus 100 may store the same image as the image for printing in advance.

The image forming apparatus 100 prints the image stored in advance.

The test pattern image and the resolution information image may not necessarily be the same number of pixel. The resolution information image may include a pixel which can correspond to each pixel included in the test pattern image.

In the above-described embodiment, the resolution of the low-resolution mode is 600 dpi and the resolution of the high-resolution mode is 1,200 dpi. However, the resolution of the low-resolution mode is not limited to 600 dpi. In addition, the resolution of the high-resolution mode is not limited to 1,200 dpi. However, the resolution of the high-resolution mode is an integer multiple of that of the low-resolution mode.

The image forming apparatus 100 may perform printing at three types or more resolutions. In this case, the image forming apparatus 100 can perform the gamma adjustment in the same manner as that of the above-described embodiment at two types of the resolution selected from three types or more printable resolutions. However, among the two types of the resolution, one resolution with the high-resolution is an integer multiple of the other resolution.

In addition, in a case where the image forming apparatus 100 can perform printing at the three types or more resolutions, the gamma adjustment with the three types or more of resolutions may be performed at a time. However, the highest resolution among the resolutions in which the gamma adjustment is performed at a time is an integer multiple of the entirety of the other resolution of the resolutions in which the gamma adjustment is performed at a time. For example, in a case of performing the gamma adjustment with k types of the resolutions of a resolution A1, a resolution A2, . . . , and a resolution Ak (k is natural number) at a time, if A1>A2> . . . >Ak, A1 is an integer multiple of A2, . . . , and A1 is an integer multiple of Ak. In this case, the image forming apparatus 100 prints the image for printing at the resolution A1. In the image for printing, the test pattern image for the resolution A1, the test pattern image for the resolution A2, . . . , and the test pattern image for the resolution Ak are included.

The resolution A1 is an example of the second resolution. In addition, any two of the resolution A2, . . . , and the resolution Ak are examples of the first resolution and the fourth resolution. The correction table of the fourth resolution is an example of the third correction information.

As an example, it is assumed that the image forming apparatus 100 can perform printing at three types or more of resolutions including the resolution B1, the resolution B2, and the resolution B3. It is assumed that B1 is n1 times B2 and B1 is n2 times B3 (n1 and n2 are both integers). However, it is assumed that B2 is not an integer multiple of B3. In this case, the image forming apparatus 100 may perform the gamma adjustment at two types or more resolutions including the resolution B2 and the resolution B3. However, the image forming apparatus 100 prints the image for printing at the resolution B1. That is, the image forming apparatus 100 performs the halftone process on a test pattern portion for the resolution B2 by using a threshold matrix obtained by multiplying the vertical and horizontal directions of a threshold matrix for the resolution B2 by n1. Then, the image forming apparatus 100 performs the halftone process on the test pattern portion for the resolution B3 by using a threshold matrix obtained by multiplying the vertical and horizontal directions of a threshold matrix for the resolution B2 by n2. With this, the image forming apparatus 100 can perform the gamma adjustment at a time even if the resolution B2 is not an integer multiple of the resolution B3.

The resolution B1 and the resolution B2 are examples of the first resolution and the second resolution. The resolution B3 is an example of the third resolution.

The processor 101 may identify the direction of the image based on the position of the mark 231 of the image read in Act 17. Then, the processor 101 may identify which of the two test patterns included in the image is for 600 dpi and which is for 1,200 dpi. By doing so, an operator of the image forming apparatus does not have to be conscious of in which direction the image forming medium P is placed on the scanner table or the tray for the document.

In the above-described embodiment, the image input to the halftone process is eight bits/channel. However, the image may be bits such as 16 bits/channel and 32 bits/channel other than eight bits/channel.

A part or all of the processes performed by the image conversion unit 109 may be performed by the processor 101. A part or all of the processes performed by the test pattern generation unit 110 may be performed by the processor 101. A part or all of the processes performed by the gamma correction unit 111 may be performed by the processor 101. A part or all of the processes performed by the halftone process unit 112 may be performed by the processor 101.

The processor 101 may realize a part or all of the processes realized by a program in the above-described embodiment by a hardware configuration of a circuit.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
a print unit configured to form an image on a medium at a resolution selected from a plurality of resolutions including a first resolution and a second resolution higher than the first resolution;
a print control unit configured to control the print unit to print on the medium an image for correction, which image for correction includes a first test pattern for gamma correction printed at a third resolution higher than the first resolution and a second test pattern for the gamma correction printed at the third resolution;
a reading unit configured to read the image for correction printed on the medium; and
a processing unit configured to obtain first correction information to be used for printing at the first resolution and second correction information to be used for printing at the second resolution, based on the reading, by the reading unit, of the image for correction on the medium,
wherein image data of the first test pattern is generated by multiplying a pixel of an original test pattern data for the gamma correction formed at the first resolution by an integer multiple.

2. The apparatus to claim 1, further comprising a generation unit configured to generate the first test pattern by performing a process for printing the test pattern for the gamma correction of the first resolution at the third resolution and generate the image for correction.

3. The apparatus to claim 2, wherein the generation unit generates the image data of the first test pattern.

4. The apparatus to claim 1, wherein the second resolution and the third resolution are the same resolution.

5. The apparatus to claim 1, wherein the image for correction includes a mark for identifying a direction of the medium.

6. The apparatus to claim 5, wherein the processing unit identifies which test pattern is for the gamma correction of the first resolution or which test pattern is for the gamma correction of the second resolution among a plurality of the test patterns included in the image for correction based on the mark.

7. The apparatus to claim 1, further comprising a correction unit configured to correct gradation of printing at the first resolution based on the first correction information and the gradation of printing at the second resolution based on the second correction information.

8. The apparatus to claim 1, wherein the print unit performs printing on the medium at the resolution selected from the plurality of resolutions including a fourth resolution different from the first resolution and the second resolution, the image for correction includes a third test pattern for printing the test pattern for the gamma correction of the fourth resolution at the third resolution, and the processing unit obtains a fourth correction information using the gamma correction of the fourth resolution.

9. An image forming method that can form an image at a first resolution and a second resolution, the method comprising:
printing an image for correction, which image for correction includes a first test pattern on a medium for gamma correction printed at a third resolution higher than the first resolution and a second test pattern for the gamma correction printed at the third resolution, in a print unit configured to form an image on the medium at a resolution selected from a plurality of resolutions including the first resolution and the second resolution higher than the first resolution;
reading the image for correction printed on the medium; and
obtaining first correction information to be used for printing at the first resolution and second correction information to be used for printing at the second resolution, based on the reading of the image for correction read on the medium, wherein obtaining the first correction information and the second correction information comprises using a first threshold with a first threshold matrix for the first resolution and using a second threshold with a second threshold matrix for the second resolution.

10. The image forming method of claim 9, further comprising determining, in a halftone process unit, whether a pixel of a resolution information image corresponds to a target pixel.

11. The image forming method of claim 10, further comprising selecting the first resolution or the second resolution for printing upon determining whether the pixel of the resolution information image corresponds to the target pixel.

12. An image forming apparatus comprising:
a print unit configured to form an image on a medium at a resolution selected from a plurality of resolutions including a first resolution and a second resolution higher than the first resolution;
a print control unit configured to control the print unit to print on the medium an image for correction, which image for correction includes a first test pattern for gamma correction printed at a third resolution higher than the first resolution and a second test pattern for the gamma correction printed at the third resolution;
a reading unit configured to read the image for correction printed on the medium; and
a processing unit configured to obtain first correction information to be used for printing at the first resolution and second correction information to be used for printing at the second resolution, based on the reading, by the reading unit, of the image for correction on the medium, wherein the third resolution is an integer multiple of the first resolution and is the integer multiple of the second resolution.

* * * * *